United States Patent [19]

Groth et al.

[11] Patent Number: 4,857,094
[45] Date of Patent: Aug. 15, 1989

[54] METHOD FOR THE MANUFACTURE OF A TOUGHENED AND/OR BENT PANE WITH SOLAR CONTROL COATING CONTAINING PLATINUM OR THE LIKE

[75] Inventors: Rolf Groth, Bochum; Franz-Josef Schmitte, Gelsenkirchen, both of Fed. Rep. of Germany

[73] Assignee: Flachglas Aktiengesellschaft, Fed. Rep. of Germany

[21] Appl. No.: 241,822

[22] Filed: Sep. 6, 1988

Related U.S. Application Data

[63] Continuation of Ser. No. 22,267, Mar. 15, 1987, abandoned.

[30] Foreign Application Priority Data

Apr. 9, 1986 [DE] Fed. Rep. of Germany ....... 3611844

[51] Int. Cl.$^4$ .............................................. C03B 27/00
[52] U.S. Cl. ...................... 65/60.2; 65/60.4; 65/60.51
[58] Field of Search ............... 65/60.2, 60.4, 60.5, 65/60.51, 60.52

[56] References Cited

U.S. PATENT DOCUMENTS 4,170,460 10/1979 Donley .............................. 65/30 R
4,240,816 12/1980 McMaster et al. ................. 65/60 R Primary Examiner—Arthur Kellogg
Attorney, Agent, or Firm—Hill, Van Santen, Steadman & Simpson

[57] ABSTRACT

Method for the manufacture of a toughened and/or bent glass pane of soda-lime-silica glass with reduced transmission for solar radiation, in which to at least one side of the transparent glass carrier is applied a metal layer of platinum, iridium or optionally rhodium, alloys of these metals or metal alloys with a majority content of at least one of these metals in a thickness such that the light transmittance of the laminate formed from the glass carrier and the metal layer is between 10 and 90%, particularly between 30 and 90% of that of the glass carrier alone and a toughening and/or bending process is performed in air at a temperature of 580° to 680° C., preferably 600° to 650° C., whereby the metal layer is applied to the substantially flat glass carrier before the toughening and/or bending process and on the side of the metal layer remote from the glass carrier an oxide stabilizing layer from or with a majority content of at least one metal oxide or mixed metal oxide, preferably from the group Bi, In, Ni, Sb, Sn, Ta, Ti and Zn is applied with a thickness of 2 to 20 nm before the toughening and/or bending process.

5 Claims, 2 Drawing Sheets a continuation of application Ser. No. 022,267, filed Mar. 15, 1987 now abandoned.

METHOD FOR THE MANUFACTURE OF A TOUGHENED AND/OR BENT PANE WITH SOLAR CONTROL COATING CONTAINING PLATINUM OR THE LIKE

This is a continuation of application Ser. No. 022,267, filed Mar. 15, 1987 now abandoned.

BACKGROUND OF THE INVENTION

1. Field of the Invention

This invention lies in the field of making coated tempered glass panes, particularly glass panes having reduced transmission of solar radiation.

2. Prior Art

Glass panes having a surface coating of a metal or metal alloy are used in the building sector and in vehicle glazing for reducing the transmission of the uncoated glass carrier in certain spectral ranges. This is done e.g., in order to subdue the light and/or obtain a solar control effect. Metals or metal alloys from elements with atomic numbers 22 to 28 of the periodic table are preferably used for the metal coating, if it is wished to obtain glass panes in which there is no colour change due to the coating in transmission and in reflection. Generally standard soda-lime-silica glass is used as the glass carrier and can be additionally in mass, tinted as is the case with bronze, gray blue and green glass. This mass tinting already leads to a basic solar control effect, which is reinforced by the coating. Particularly in the case of glazing systems for motor vehicles, frequent use is made of green tinted glass, which has a good solar control effect, in conjunction with high light transmittance. In such cases, particular interest is attached to mixed glazing systems, some of the panes being additionally coated. Thus, for example, the windscreen and furthest forward side windows, which are subject to high legal requirements regarding the minimum light transmittance, are made from green mass tinted glass. For the rear part of the vehicle, where lower light transmittance values are accepted, use is made of panels which are mass tinted and additionally coated in order to increase the protection against the solar radiation. It is particularly important in such mixed glazing systems to use a coating without any colour distortion in reflection and transmission, so that viewed from the interior there should be no disturbing colour difference between the individual panes. The same applies to the colour impression of the vehicle when viewed from the outside.

In many applications, including those described hereinbefore, it is necessary to thermally toughen the glass carrier, which e.g., takes place for increasing the mechanical stability, for preventing heat cracks and for reducing injury risks in the case of the glass breaking. Toughening is carried out by heating the almost exclusively used soda-lime-silica glass panes in air to a temperature above the glass transformation point, followed by rapid cooling. The temperatures required for toughening are in the range 580° to 680° C. and preferably 600° to 650° C. The same temperature range is also required if the glass panes which come flat from the glass manufacturing process undergo a bending process. Hitherto the application of said colour-neutral metal coatings has visually taken place after the toughening and/or bending process and the cooling of the panes, use generally being made of vacuum coating processes, where the glass panes are coated in vacuum chambers at very low pressure and at temperatures near room-temperature.

This procedure of applying the coating after the toughening and/or bending process has numerous disadvantages compared with a procedure in which initially the coating is applied and then the toughening and/or bending process is carried out. Thus, in the former case only cut sizes can be coated, because toughened panes cannot be cut. However, with regards to the coating procedure it is much more advantageous to coat standard sizes, particularly the lehr end sizes of glass production by the float process. In the latter case, it is much easier to obtain a uniform coating thickness than with cut sizes with the necessary gaps between the individual panes in the vacuum coating apparatus. In addition, the transfer of such standard sizes through the coating apparatus is much less complicated than in the case of having to transfer individual pieces of different sizes.

Another disadvantage is that as a result of the high temperatures of the toughening and/or bending process impurities on the glass surface frequently form such a firm bond therewith that they cannot be removed during the following surface cleaning and before performing the coating process to the extent necessary for said coating process. They are quasi burned into the glass surface, which leads to a disturbing deterioration of the coating quality.

In the case of coating bent panes, the problem of obtaining an adequate coating uniformity is naturally particularly serious, because due to the curvature of the panes the angles and distances between the glass surface and the coating sources differ over the pane change. In addition, the costs of vacuum coating plants for coating bent panes are much higher than for coating flat panes, because it is necessary for the inlet and outlet locks, as well as the locks between the different coating stations to be much wider than when coating flat glass.

For eliminating the aforementioned difficulties, namely permitting the application of the coating prior to the toughening and/or bending process when using metals or metal alloys of elements with atomic numbers 22 to 28, it has already been proposed (German patent application No. P 35 44 840.7-45), prior to the toughening and/or bending process, to apply to a substantially flat glass carrier the metal layer with a majority content of a metal or metal alloy from the elements with atomic numbers 22 to 28 of the periodic table and to the side remote from the glass carrier a protective layer of at least one metal oxide or mixed metal oxide which, based on a metal atom of the metal oxide or oxides, has an oxygen deficit x of $0.05 \leq x \leq 0.4$ and a thickness of 10 to 100 nm and a composition such that, during the toughening and/or bending process, there is no noteworthy oxygen diffusion in to the metal layer.

It might be obvious for the toughening and/or bending process to follow the application of the coating to replace the above named metals by platinum, iridium or optionally rhodium because of their oxidation stability. However, the process known from French Pat. No. 12 71 584 of providing glass carriers with platinum or rhodium coatings prior to a tempering process and then carry out the latter has not been succesful when used in a method of the type to which the present application is directed. For explanation purposes, it is pointed out that French Pat. No. 12 71 584 describes a procedure in which relatively thick platinum or rhodium coatings, which in transmission and reflection have the desired colour neutrality are treated, by a tempering process in air. It is also possible according to the said French Patent protect the precious metal coating by a layer of an enamel or glaze, which can be burnt in a furnace. If this process of providing the glass carrier with the platinum or rhodium coating and then carrying out a toughening and/or bending process is used with the relatively thin coatings to which the method of the present application is directed, the tempering process leads to disturbing coating modifications. The coating turns cloudy, which can be detected as a disturbing stray light level, e.g., when illuminating with direct sunlight. Therefore such glass panes are unsuitable for solar control purposes in building or vehicle glazing systems. Moreover, particularly in the case of coated glass carriers with a light transmittance above approximately 40%, based on the light transmittance of the uncoated glass carrier, there is an increase in the transmission for the spectral range of solar radiation and therefore a deterioration of the solar control effect due to the tempering process.

BRIEF SUMMARY OF THE INVENTION

The invention relates to a method for the manufacture of a toughened and/or bent glass pane of soda-lime-silica glass with reduced transmission for solar radiation, in which to at least one side of the transparent glass carrier is applied a metal layer of platinum, iridium or optionally rhodium, alloys of these metals or metal alloys with a majority content of at least one of these metals in a thickness such that the light transmittance of the laminate formed from the glass carrier and the metal layer is between 10 and 90%, particularly between 30 and 90% of that of the glass carrier alone and a toughening and/or bending process is performed in air at a temperature of 580° to 680° C., preferably 600° to 650° C.

It is the object of the present invention to so further develop the said method that the disadvantages linked with coating the glass carrier only following the toughening and/or bending process are avoided and, without any risk of changes to the metal layer, it is possible to carry out the necessary coating process prior to the toughened and/or bending process, whilst obtaining the relatively high transmission values and good color nuetrality.

According to the invention the metal layer is applied to the substantially flat glass carrier before the tampering and/or bending process and on the side of the metal layer remote from the glass carrier an oxide stabilizing layer from or with a majority content of at least one metal oxide or mixed Ta, Ti and Zn is applied with a thickness of 2 to 20 nm before the toughening and/or bending process.

In a preferred embodiment, the stabilizing coating is applied in a thickness of max 15 nm.

In a further preferred embodiment, the stabilizing coating is applied in a thickness of max 12 nm.

In an embodiment of the invention, $In_2O_3$, mixed oxides of indium and tin, $Sb_2O_3$ or $Bi_2O_3$ can be used for the stabilizing coating.

Other and further aims, objects, purposes, advantages, uses, and the like for the present invention will be apparent to those skilled in the art from the present specification.

BRIEF DESCRIPTION OF DRAWINGS

Further features and advantages of the invention can be gathered from the following description, in which, inter alia, embodiments are explained in detail with reference to the drawings, wherein show.

Figure 1:
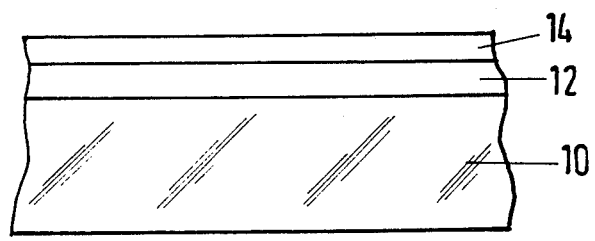
FIG. 1: An embodiment of a glass pane which can be manufactured according to the inventive method in section and at right angles to the pane plane.

The present invention provides a method for the manufacture of a tempered and/or bent glass pane of soda-lime-silica glass with reduced transmission for solar radiation. To this end, to at least one side of the transparent glass carrier is applied a metal coating of platinum, iridium or optionally rhodium, alloys of these metals or metal alloys with a preponderant portion of at least one of these metals. The coating is applied in a thickness such that the light permeability of the laminate formed from the glass carrier and the metal coating is between 10 and 90%, particularly between approximately 30 to about 90% of that of the glass carrier alone. The metal coating is applied to the substantially flat glass carrier before the tempering and/or bending process.

On the side of the metal coating remote from the glass carrier an oxide stabilizing coating is applied. The stabilizing coating includes at least one metal oxide or mixed metal oxide. Preferably, the metal oxide is chosen from the group consisting of Bi, In, Ni, Sb, Sn, Ta, Ti, and Zn. Preferably, the coating is applied in a thickness of approximately 2 to about 20 nm before the tempering and/or bending process.

After the coatings are applied, a tempering and/or bending process is performed in air at a temperature of 580° to 680° C., preferably, approximately 600° to about 650° C.

One illustrative and presently preferred class of metal compositions suitable for use as a metal coating in preparing a tempered and/or bent glass pane structure of the present invention as described herein is comprised of at least one noble (precious) metal, such as a noble metal which is relatively stable to oxidation at temperatures in the 580° to 680° C. range, selected from the group consisting of platinum, iridium, and rhodium. Mixtures (alloys) of such noble metals can be employed.

The transverse (vertical) thickness of the metal layer is such that the light transmittance through the combined substrate carrier glass pane and the metal layer ranges from about 10 to 90 percent, preferably from about 30 to 90 percent, of the light transmittance of the starting substrate carrier glass pane alone. Conveniently, light transmittance values are used to control the thickness of coatings and determined by measurements made in accord with a convention procedure. As a practical matter, the actual thickness of such a metal layer layer typically falls in the range from about 2 to 20 nm.

One illustrative and presently preferred class of metal oxide compositions suitable for use as the oxide layer in preparing a toughened and/or bent glass pane as described herein is comprised of at least one oxide of at least one metal selected from the group consisting of Bi, In, Ni, Sb, Sn, Ta, Ti, and Zn. In an embodiment of the present invention, the preferred metal oxides of the above indicated preferred group are $In_2O_3$, mixed indium and tin oxides, $Sb_2O_3$, and $Bi_2O_3$.

In an embodiment of the glass pane structure of the present invention, the metal oxide composition is preferably substantially homogeneous.

According to the invention, it is preferred that the coating of the glass carrier takes place by a vacuum process.

It is proposed that both layers are applied by cathodic sputtering, particularly magnetron cathodic sputtering.

The invention is based on the surprising finding that it is possible by applying the stabilizing layer to prevent the occurrence of cloudiness in the thin precious metal layer. The mechanism, how the stabilizing layer protects the metal layer is not known. It cannot be a protective action in the sense that the oxide layer prevents the of oxygen from the air from diffusing to the previous metal layer, because in the case of such a mechanism it would be incomprehensible why thicker "layers" precious metal without an outer stabilizing layer, as are used in the process of French Pat. No. 12 71 584, are not affected by the disturbing coating changes, caused by the tempering process application of the metal coating.

It is also surprising that for the action of the stabilizing coating it is merely necessary to have very small layer thicknesses, the necessary minimum only being approximately 2 nm. This is advantageous, because in this range of very small layer thicknesses, the optical data, particularly the neutrality in transmission and reflection of the metal layer are not disturbed by interference effects caused by the dielectric stabilizing layer. As is known, such visually disturbing interference effects only occur with layer thicknesses above 15 nm, particularly above 20 nm. The fact that even very small oxide coating thicknesses are sufficient for carrying out the method of the invention also leads to considerable advantages regarding the performance of the method, because the coating process can then be performed with considerable tolerances with respect to the coating thickness, without coating thickness fluctuations leading to a change in the technical data and the appearance of the coating. This is a major advantage for coating large glass panes of the type almost exclusively used in the application of interest here, because coating thickness uniformity problems generally increase with the pane sizes.

In the invention, it is optionally possible to provide between the glass carrier and the metal layer an additional oxide layer, in order to improve the adhesion of the coating to the glass carrier, such oxide layers being known per se e.g., from German Application No. L 13 792 VIII d in the form of adhesion promoting layers for metal for improving the electrical conductivity of the latter. German Utility Model No. 17 34 744 already discloses a glass pane with a platinum layer and an oxidic protective layer applied thereto and which serves to protect the platinum layer against mechanical and chemical actions, without this literature reference disclosing the action of the inventively proposed stabilizing layer in the case of relatively thin metal layers of the type provided in the inventive method.

In connection with the performance of the inventive method, layers of $In_2O_3$, mixed oxide layers of the metals indium and tin, $Sb_2O_3$ coatings and $Bi_2O_3$ coatings have proved particularly suitable for the stabilizing coating, because, inter alia, this leads to a particularly hard and abrasion-resistance coating, such as is especially advantageous to the further handling of the glass panes after performing the toughening and/or bending process. Apart from platinum, which has proved to be particularly suitable as a material for the metal layer, iridium and optionally rhodium, as well as alloy layer of platinum, iridium and optionally rhodium have proved suitable. It is also possible to use alloy coatings in which less precious metals are added to the aforementioned metals or their alloys. However, these additions must be so small that the precious metal character is largely retained, so that the maximum less precious metal additions represents approximately 50 atomic percent according to the rule drawn up by Tamman (G. Tamman, "Lehrbuch der Metallkunde", Edition IV, 1932, Leopold Frost, Leipzig, p. 428 ff).

According to the method of the invention, the coating is generally produced by vacuum coating. The coatings can be applied by evaporating from resistance-heated evaporator means or by electron beam evaporation. Cathodic sputtering in the form of direct current or low frequency sputtering, but in particular high frequency and magnetron cathodic sputtering are also suitable. The metal or metal alloy layers can either be produced by direct evaporation or sputtering in neutral atmosphere. The reactive evaporation method is suitable for producing the oxide coatings. The reactive cathodic sputtering, particularly reactive magnetron cathodic sputtering, in which sputtering takes place of corresponding metal or metal alloy targes in an atmosphere, inter alia, containing oxygen is also suitable.

It is also pointed out that particularly when performing the tempering process over long periods of time, as is frequently the case during bending, the inventive method can also be advantageously used with light transmittance values of less than 30%, e.g., 20%, because this also acts favorably against the otherwise unavoidable clouding effect.

EMBODIMENTS

The present invention is further illustrated by reference to the following examples. Those skilled in the art will appreciate that other and further embodiments are obvious and within the spirit and scope of this invention from the teachings of these present examples taken with the accompanying specification.

As shown in FIG. 1, the glass plate shown therein has a transparent soda-lime-silica glass carrier 10 carrying a platinum metal layer 12. On the side of metal layer 12 remote from glass carrier 10 is applied an $In_2O_3$. stabilizing layer 14.

EXAMPLE 1

In a vacuum coating plant equipped with coating means for magnetron cathodic sputtering, the following layers were successively applied to a 10 cm×10 cm float glass plane. Firstly a platinum layer 3.2 nm thick was applied by sputtering a platinum target in an argon atmosphere at a pressure of $5.10^{-3}$ mbar. The stabilizing layer was then applied as an antimony oxide layer by the reactive sputtering of an antimony target in an argon-oxygen atmosphere with a 50% oxygen proportion at a pressure of $5.10^{-3}$ mbar. The antimony oxide layer thickness was 6 nm.

The coated pane had a neutral appearance in both transmission and reflection. The light transmittance of the coated pane was 60%, whereas the uncoated pane had a light transmittance of 90%.

The coated pane was then heated in a tempering furnace to 600° C. and cooled. There was substantially no change to the appearance and the light transmittance of the pane as a result of the tempering process.

EXAMPLE 2

The procedure of example 1 was adopted, with the difference that no antimony oxide stabilizing layer was applied. In transmission and in reflection, the coated pane had the same neutral appearance as in example 1 and the light transmittance was 60%.

As in example 1, the coated pane was then tempered. Following this process, the coating was cloudy having a disturbing high stray light level on illumination with a projection lamp. In addition, the light transmittance had increased to 68%.

Figure 2:
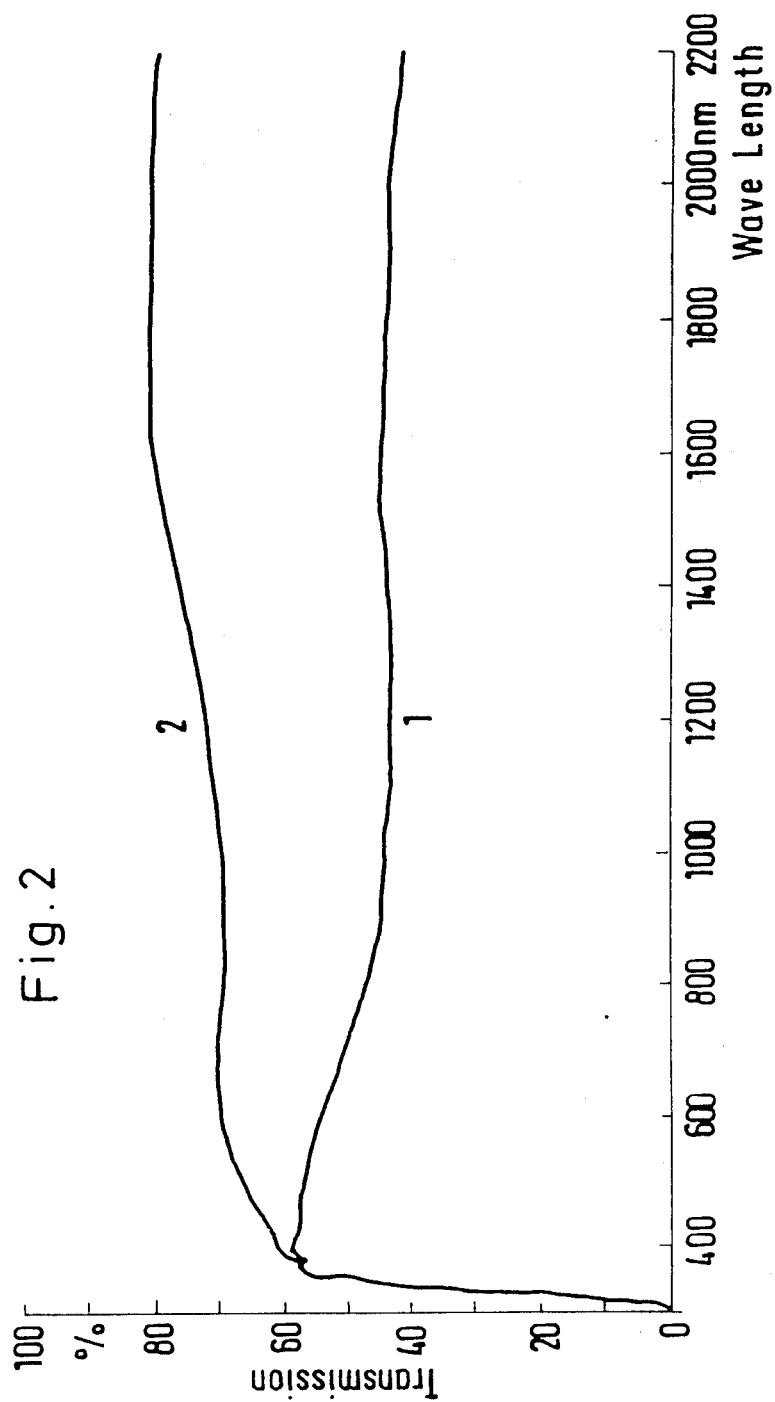
FIG. 2: The spectral transmission curves of a glass pane manufactured according to the prior art before and after performing the tempering process.

FIG. 2 shows the spectral transmission curves prior to carrying out the tempering process (curve 1) and after said process (curve 2). They show that the solar control effect has been considerably reduced by tempering.

EXAMPLE 3

In a vacuum coating plant, as described in example 1, the following layers were successively applied to a 10 cm × 10 cm float glass pane:
- a 5 nm thick adhesion $In_2O_3$ promoting layer by the reactive sputtering of an indium target at a pressure of $5.10^{-3}$ mbar in an argon-oxygen atmosphere of composition 60% AR and 40% $O_2$,
- a 7 nm platinum layer by sputtering a platinum target in an argon atmosphere at a pressure of $5.10^{-3}$ mbar, and
- a 5 nm thick $In_2O_3$ stabilizing layer by the reactive sputtering of an In target under the same condition as for the first $In_2O_3$ layer.

The coating pane had a light transmittance of 40% and had a neutral appearance in transmission and reflection. The coated pane was then tempered as in example 1.

There was substantially no change to the appearance and light transmittance of the pane as a result of the tempering process.

EXAMPLE 4

As in example 3, a platinum layer was applied, but without the additional $In_2O_3$ layers. Here again the light transmittance of the coated pane was 40%.

Although after tempering the light transmittance was still 40%, the coating was cloudy and this was visible as disturbing stray light when illuminated with a projection lamp. Thus, in this form the coating was unsuitable for the indicated used.

EXAMPLE 5

A coating as described in example 3 was applied, but the pure platinum was replaced by a coating of a platinum-silver alloy of composition 70 atom % platinum and 30 atomic % silver in a thickness of 5 nm. The coated pane had a light transmittance of 51% and a neutral appearance both in transmission and in reflection.

As in example 3, the appearance and light transmittance of the pane were substantially unchanged during of the tempering process.

The features of the invention disclosed in the above description, the claims and the drawings can be essential to the realization of the inventive concept in its different embodiments, either singly or in random combinations.

We claim as our invention:

1. A method for manufacturing a toughened and/or bent glass pane constructed from soda-lime-silica glass and having a reduced transmission of solar radiation consisting of the steps of:
    vacuum coating at least one side of a transparent glass carrier with a metal layer comprising at least one constituent chosen from the group consisting of: platinum, iridium, rhodium, platinum alloys, iridium alloys, rhodium alloys at ambient temperature;
    the metal layer being applied being applied in a thickness such that the light transmittance of a laminate formed from the glass carrier and the metal layer is between approximately 10 to about 90 percent of that of the glass carrier alone;
    vacuum coating at ambient temperature the resultant metal layer with an oxide stabilizing layer having an oxide of at least one metal chosen from the group consisting of: Bi, In, Ni, Sb, Sn, Ta, Ti, and Zn, the stabilizing layer being applied in a thickness of approximately 2 to about 20 mm; and
    heating to bend and/or toughen the glass pane at a temperature of approximately 580° to about 680° C. without further steps to prevent metal migration into the glass pane to occur.

2. A method according to claim 1, wherein the stabilizing layer is applied in a thickness of max 15 nm.

3. A method according to claim 1, wherein the stabilizing layer is applied in a thickness of max 12 nm.

4. A method according to claim 1, wherein the stabilizing layer is applied by magnetron cathodic sputtering.

5. The process of claim 1 wherein said second coating comprises on a 100 weight percent total weight basis of at least about 85 weight percent of at least one said metal oxide with the balance up to 100 weight percent being at least one other metal oxide.

* * * * *